US010891547B2

(12) United States Patent
Bradley et al.

(10) Patent No.: US 10,891,547 B2
(45) Date of Patent: Jan. 12, 2021

(54) VIRTUAL RESOURCE T-SHIRT SIZE GENERATION AND RECOMMENDATION BASED ON CROWD SOURCING

(71) Applicant: International Business Machines Corporation, Armonk, NY (US)

(72) Inventors: Lisa Wood Bradley, Cary, NC (US); Aaron J. Quirk, Cary, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1178 days.

(21) Appl. No.: 15/244,214

(22) Filed: Aug. 23, 2016

(65) Prior Publication Data

US 2018/0060740 A1 Mar. 1, 2018

(51) Int. Cl.
*G06N 5/02* (2006.01)
*G06F 9/50* (2006.01)
*G06F 8/60* (2018.01)
*G06F 9/455* (2018.01)

(52) U.S. Cl.
CPC ............... *G06N 5/025* (2013.01); *G06F 8/60* (2013.01); *G06F 9/45558* (2013.01); *G06F 9/5005* (2013.01)

(58) Field of Classification Search
CPC ........ G06N 20/00; G06N 5/025; G06N 7/005; G06K 9/6256; G06K 9/6269
USPC .......................................................... 706/12
See application file for complete search history.

(56) References Cited

U.S. PATENT DOCUMENTS

| | | | | |
|---|---|---|---|---|
| 8,806,483 B2* | 8/2014 | Anderson, III | ....... | G06F 9/5077 718/1 |
| 10,002,337 B2* | 6/2018 | Siddique | ................ | G06Q 30/06 |
| 2010/0030578 A1* | 2/2010 | Siddique | ............. | G06Q 20/204 705/3 |
| 2010/0076819 A1* | 3/2010 | Wannier | ................ | G06Q 30/02 705/7.33 |

(Continued)

FOREIGN PATENT DOCUMENTS

GB 2526978 A 12/2015

OTHER PUBLICATIONS

Gmach et al. "Selling T-shirts and Time Shares in the Cloud", Cluster Computing and the Grid, IEEE International Symposium, 2012.

(Continued)

*Primary Examiner* — Viker A Lamardo
(74) *Attorney, Agent, or Firm* — Brown & Michaels, PC; Christopher Pignato

(57) ABSTRACT

T-shirt size recommendation for a first user based on crowd sourcing. A recommendation for t-shirt size may be made by defining a first image of a container based on historical data related to container instantiation; receiving, by the computer, from a first user, a request to deploy a first instantiation of a container corresponding to the first image, with the request including input data including information indicative of a planned context of the first instantiation; applying a plurality of machine logic based rules to the input data to determine a first a first recommended T-shirt size associated with the first image; and communicating, by the computer, the first recommended T-shirt size to the first user for use with the first instantiation of the container corresponding to the first image.

14 Claims, 4 Drawing Sheets

(56) References Cited

U.S. PATENT DOCUMENTS

| | | | | |
|---|---|---|---|---|
| 2011/0099122 | A1* | 4/2011 | Bright | G06Q 10/04 |
| | | | | 705/348 |
| 2013/0211774 | A1* | 8/2013 | Bentley | A61B 5/11 |
| | | | | 702/145 |
| 2013/0212276 | A1* | 8/2013 | Abuelsaad | G06F 9/5072 |
| | | | | 709/226 |
| 2013/0215116 | A1* | 8/2013 | Siddique | G06Q 30/0643 |
| | | | | 345/420 |
| 2014/0176565 | A1* | 6/2014 | Adeyoola | G06T 19/006 |
| | | | | 345/473 |
| 2014/0215073 | A1* | 7/2014 | Dow | H04L 67/10 |
| | | | | 709/226 |
| 2014/0358738 | A1* | 12/2014 | Ohnemus | G06Q 30/0643 |
| | | | | 705/27.2 |
| 2016/0210602 | A1* | 7/2016 | Siddique | G06Q 20/0453 |
| 2017/0004567 | A1* | 1/2017 | Dutt | G06Q 30/0643 |
| 2017/0091844 | A1* | 3/2017 | Yarvis | G06Q 30/016 |
| 2017/0235436 | A1* | 8/2017 | Hooton | G06F 3/0482 |
| | | | | 705/7.11 |

OTHER PUBLICATIONS

"How is Docker different from a normal virtual maching?" http://stackoverflow.com/questions/16047306/how-is-docker-different-from-a-normal-virtual-machine; Apr. 2013.

Daconta, M. "Containers Add New Efficiency to Cloud Computing"; http://www.informationweek.com/cloud/containers-add-new-efficiency-to-cloud-computing/d/d-id/1112037?; Oct. 2013.

* cited by examiner

VIRTUAL RESOURCE T-SHIRT SIZE GENERATION AND RECOMMENDATION BASED ON CROWD SOURCING

BACKGROUND

The present invention relates to cloud computing systems, and more specifically to virtual resource t-shirt size generation and recommendation based on crowd sourcing.

In hosted cloud environments, it is common for a cloud provider to predict a fixed size of t-shirt sizes and use the fixed t-shirt sizes with various clients and their needs. The fixed sizes are used by the hosted platform of the cloud provider to optimize scheduling and reservation of resources, as well as enable the cloud provider to make assumptions regarding resource size needed. The fixed sizes are limiting to the customer.

SUMMARY

According to one embodiment of the present invention a method is disclosed. The method comprising: a computer defining a first image of a container based on historical data related to container instantiation; the computer receiving from a first user, a request to deploy a first instantiation of a container corresponding to the first image, with the request including input data including information indicative of a planned context of the first instantiation; the computer applying a plurality of machine logic based rules to the input data to determine a first a first recommended T-shirt size associated with the first image; and the computer communicating the first recommended T-shirt size to the first user for use with the first instantiation of the container corresponding to the first image.

According to another embodiment of the present invention, a computer program product is disclosed. The computer program product comprising a computer comprising at least one processor, one or more memories, one or more computer readable storage media, the computer program product comprising a computer readable storage medium having program instructions embodied therewith. The program instructions executable by the computer to perform a method comprising: defining, by the computer, a first image of a container based on historical data related to container instantiation; receiving, by the computer, from a first user, a request to deploy a first instantiation of a container corresponding to the first image, with the request including input data including information indicative of a planned context of the first instantiation; applying, by the computer, a plurality of machine logic based rules to the input data to determine a first a first recommended T-shirt size associated with the first image; and communicating, by the computer, the first recommended T-shirt size to the first user for use with the first instantiation of the container corresponding to the first image.

According to another embodiment of the present invention a computer system is disclosed. The computer system comprising a computer comprising at least one processor, one or more memories, one or more computer readable storage media having program instructions executable by the computer to perform the program instructions. The program instructions comprising: defining, by the computer, a first image of a container based on historical data related to container instantiation; receiving, by the computer, from a first user, a request to deploy a first instantiation of a container corresponding to the first image, with the request including input data including information indicative of a planned context of the first instantiation; applying, by the computer, a plurality of machine logic based rules to the input data to determine a first a first recommended T-shirt size associated with the first image; and communicating, by the computer, the first recommended T-shirt size to the first user for use with the first instantiation of the container corresponding to the first image.

DETAILED DESCRIPTION

Figure 1:
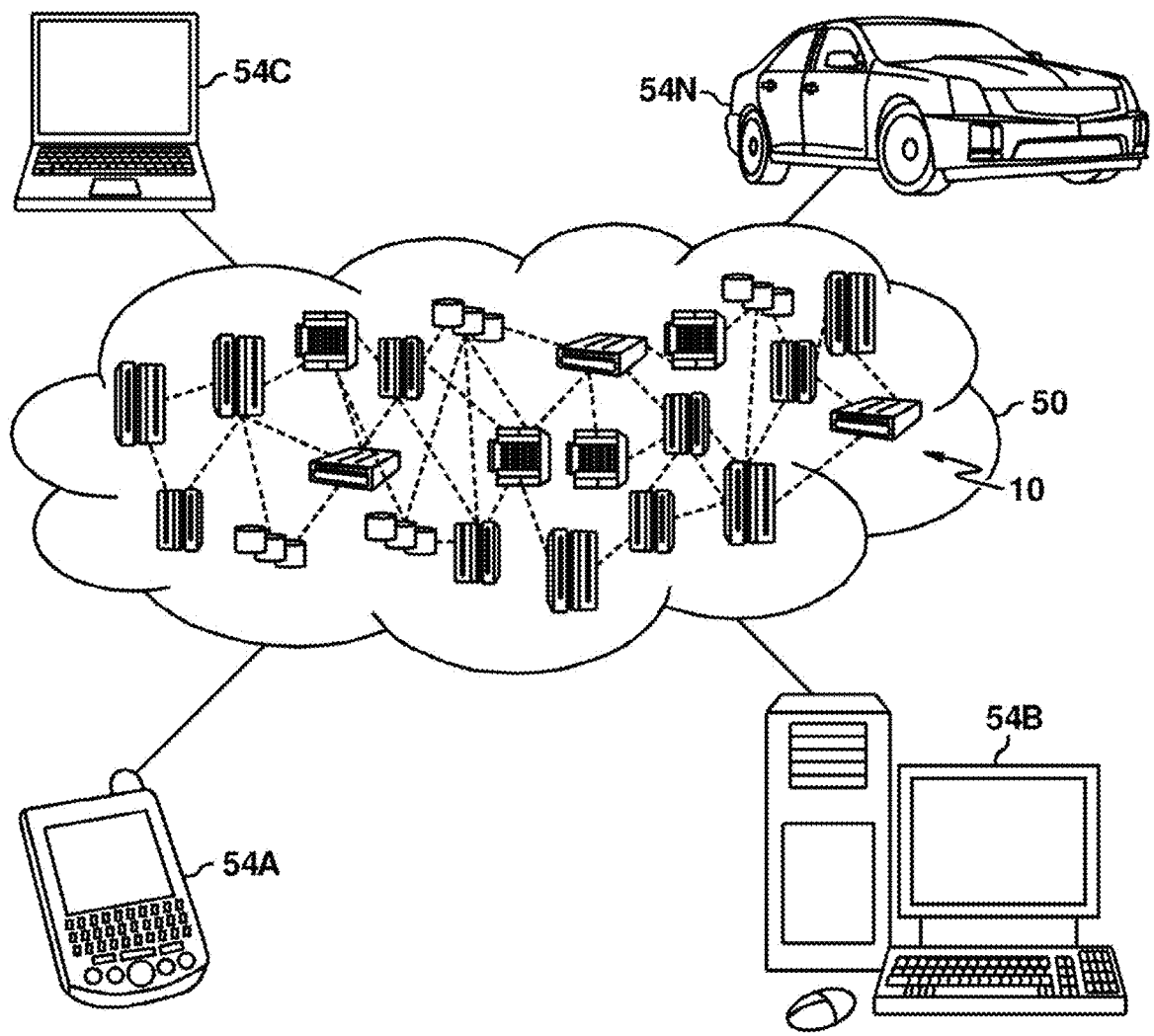
FIG. 1 depicts a cloud computing node according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least four service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Containers as a Service (Caas): the capability provided to the consumer is to efficiently run a single application through an operating system in the form of a virtual container as though the single application is the only application running in an operating system without any conflicts with other application containers running on a same machine. The consumer does not manage or control the underlying cloud infrastructure but has control over operating systems such as a container orchestration platform which handles containers, key tasks, container deployment, cluster management, scaling, reporting and lifecycle management. Container as a Service may be a subset of Infrastructure as a Service.

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
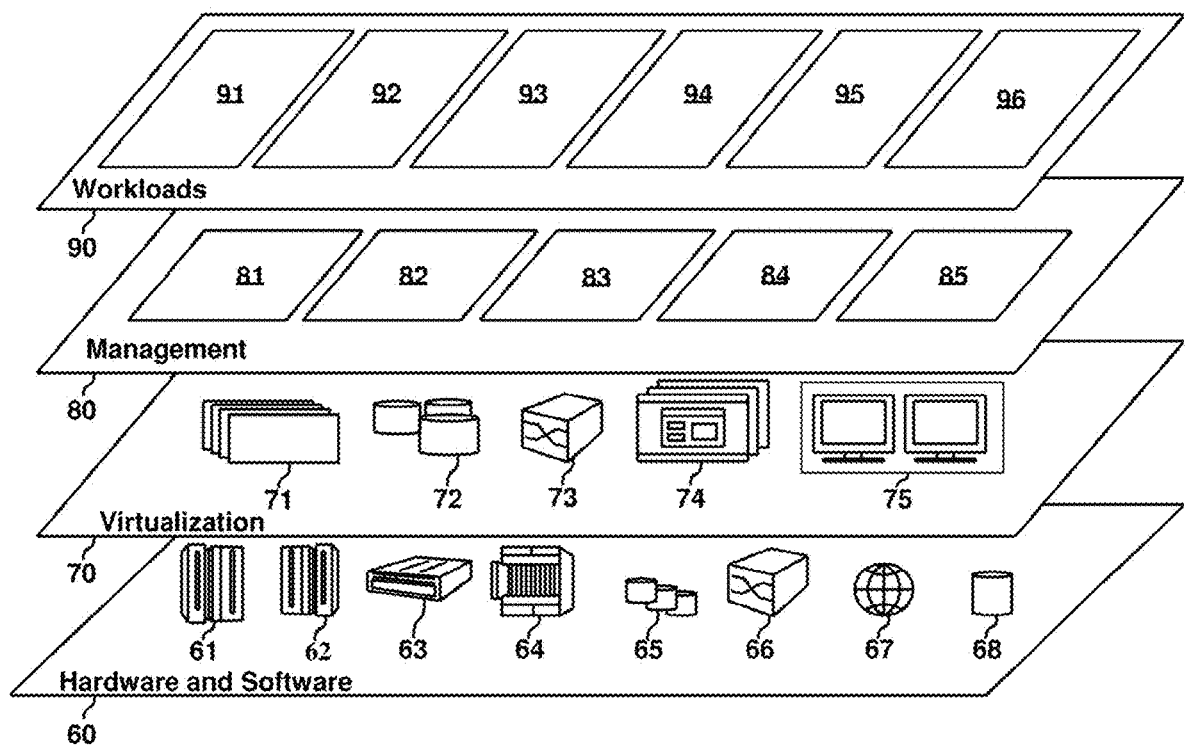
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and t-shirt size recommendations 96.

The term "t-shirt size" in the present application is defined as: a predetermined allocation of resources associated with a container of the cloud computing system which is deployed and re-deployed in a cloud computing system. The t-shirt size typically includes at least allocation amounts for volatile type memory, non-volatile type storage and processing power.

It will be recognized that in an embodiment of the present invention, a container's unique aspects, such as layering in containers and community images ratings along with portability of docker images, may be used to suggest to users a recommended t-shirt size for a given image based on crowd sourcing of running images by other users in the cloud computing environment.

It will also be recognized that the method of the present invention uses data regarding characteristics which are unique to and exist only in containers, and are not present in or applicable to virtual machines. One example is image layering with a layered file system and community portable images that can run anywhere to build on recommending the t-shirt size. Image layering is not present in a virtual machine image and thus an image layer cannot be leveraged to determine a recommended t-shirt size. Another example of characteristics that are not present in regards to virtual machines may be container launch time, lifetime length, how often containers are built, name/tag of the container. In another example, review or rating of the image in the community repository like dockerhub may also be used and is not present or applicable to virtual machines.

It will also be recognized that in an embodiment of the present invention, the set of available fixed images or t-shirt sizes to a user of a cloud platform is expanded while still maintaining criteria required by the cloud computing environment. The expansion of the t-shirt sizes is based on analytics on the user's existing or other user's image library (containers), historical usage, and actual resource utilization over time, and is compared to other users who have similar attributes in the community to provide suggested t-shirt sizing for the user at deployment time or other phases to allow better resource utilization of the cloud computing environment.

Figure 3:
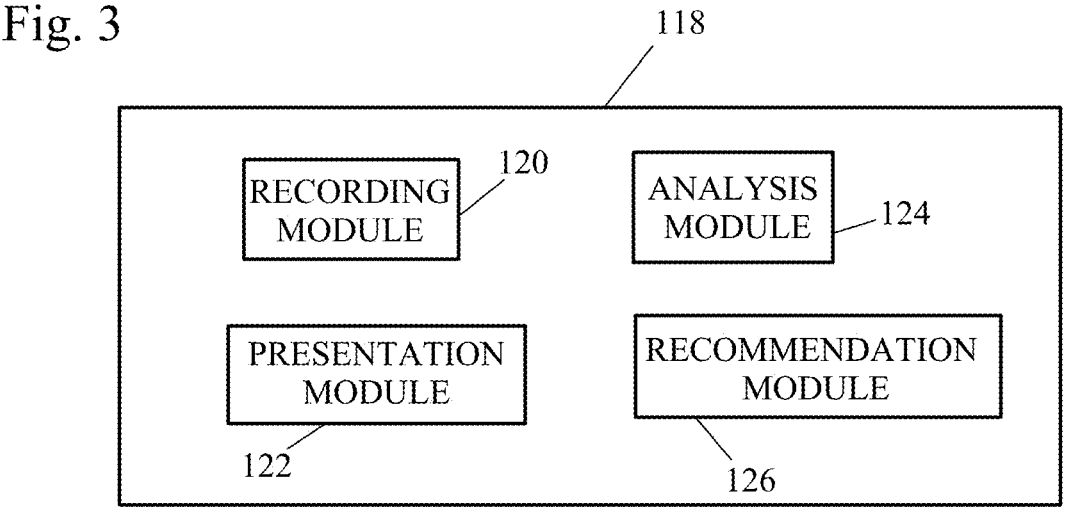
FIG. 3 shows a schematic of modules present in the cloud computing environment.

FIG. 3 shows a schematic of modules present in the cloud computing environment. The management layer 80 is providing resource provisioning 81 and may use a recommendation system 118. The recommendation system 118 of the cloud computing environment may contain a recording module 120, a presentation module 122, an analysis module 124 and a recommendation module 126.

The recording module 120 tracks and records specific characteristics of all running containers in the cloud computing environment.

The analysis module 124 analyzes all the data of the recording module 120 at an interval. The analysis module 124 examines each of the characteristics of the containers that are running using an image name and tag, as well as the container lifetime length.

The recommendation module 126 determines a recommendation of any new containers and sizes based on an image name and tag present in the running containers analyzed by the analysis module 124.

The presentation module 122 presents a recommendation to a user for default configuration of launching containers.

Figure 4:
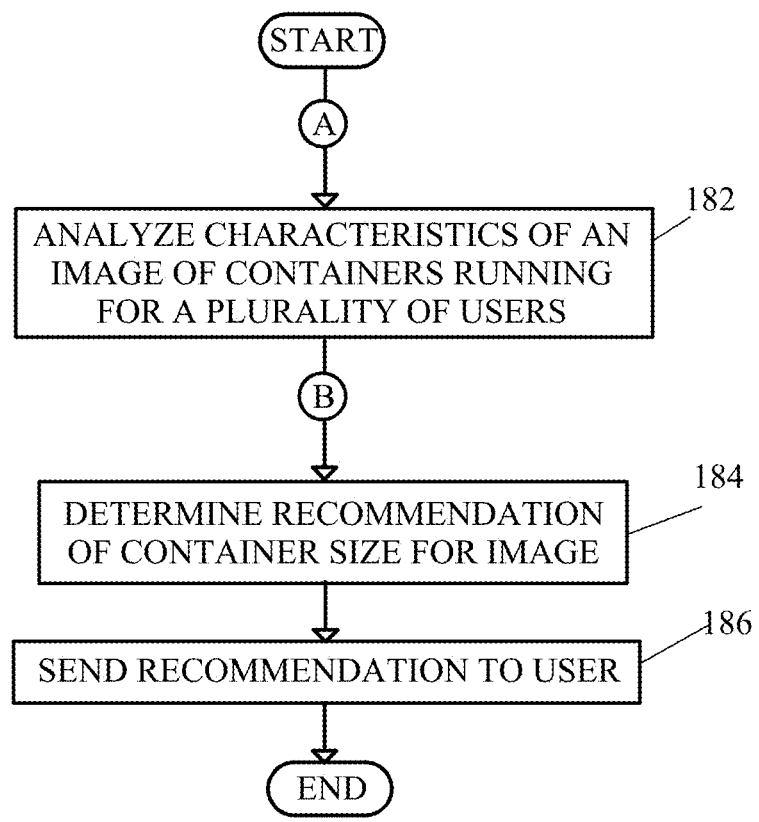
FIG. 4 shows a flow diagram of a method of t-shirt size generation and recommendation based on crowd sourcing.

FIG. 4 shows a flow diagram of a method of t-shirt size generation and recommendation to a first user based on crowd sourcing.

Characteristics of images including containers running for a cloud provider are analyzed to determine a first image of a container being used by a plurality of clients (step 182). The plurality of clients may include images already in use for a first user. Characteristics include, but are not limited to: container initial T-shirt size; container actual resource utilization used over time; central processing unit (CPU), memory, and disk over the life cycle of each container (e.g. historical usage); image name and tag used for each container.

The data from the characteristics may be recorded by the recoding module 120 of the recommendation system 118. The analysis preferably leverages crowd sourcing of the cloud provider by comparing images to other users who have similar attributes in the community to provide suggested t-shirt sizing for the user at deployment time or other phases to allow better resource utilization of the cloud computing environment.

The characteristics from the containers being analyzed are preferably analyzed at intervals repetitively by the analysis module 124 of the recommendation system 118. The analysis module 124 examines each of the characteristics of the containers that are running using each image name and tag. Additionally, the container lifetime length is analyzed to aid in determining recommendations for future containers that use the same image name and tag. Other data such as user feedback or input may also be used.

A recommendation of containers to be used for an image based on the analyzation of the characteristics of the images of containers of a plurality of users is determined (step 184). The recommendation preferably includes the right T-shirt size based on actual CPU, memory and disk, optimized for the run time for each container image name and tag and how often the containers need to rebuilt. The T-shirt size recommended may add new t-shirt sizes for the client if the initial t-shirt sizes don't cover the recommended t-shirt size.

The determined recommendation is sent to the new client (step 186) and the method ends. The recommendation is sent to the user through the presentation module 122 of the recommendation system 118. The recommendation may be used in the default configuration of the new client for launching containers. The recommendation may also be used and applied during different phases of development.

The recommendation may be communicated in machine readable form and format or in human understandable form and format.

Figure 5:
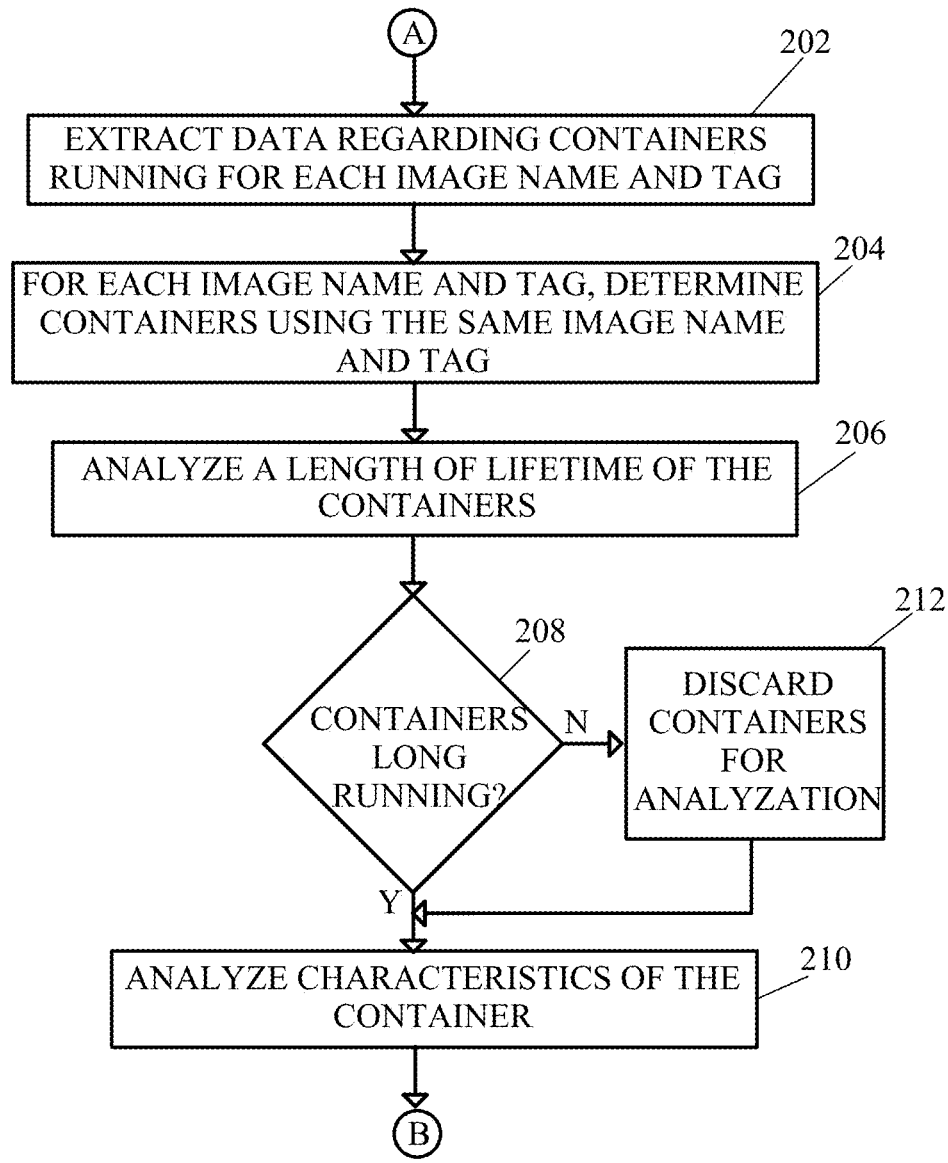
FIG. 5 shows a flow diagram of a method of analyzing characteristics of containers running for other clients.

FIG. 5 shows a flow diagram of a method of analyzing characteristics of containers running for other clients (step 182) by the analysis module 124.

Data regarding containers running for each image and tag are extracted (step 202).

For each image name and tag, the container using the same name and tag are determined (step 204), for example by the analysis module 124.

A length of the lifetime of each of the containers using the same name and tag is analyzed (step 206). The length of the lifetime of each of the containers is determined and includes whether the containers have been running long enough, for example more than a few minutes. If the containers are short lived, the container may be in a debug stage and would not be considered during the analyzation process.

If the containers are long running (step 208), the initial t-shirt size at container launch of the containers running, the actual resources used, and how often the container is rebuilt is analyzed (step 210) and the method returns to step 184 of determining a recommendation. For each of the long running containers, the resources that may be used for analyzation may be, but are not limited to actual CPU, memory, and disk which are used over time. It should be noted that the term "long running" may contain a range of time which is considered to running for an appropriate amount of time and may also contain short running containers which are specifically designed to be short running.

If the containers are not long running (step 208), then the containers are discarded from analyzation (step 212) and the method continues with step 210.

In other words, the analysis module will analyze all recorded data and determine for a given image, what is the most popular t-shirt size that has been used. If a user provides positive feedback regarding a specific image, the user's input may be a characteristic which is considered and may bear weight during the analysis. If there is insufficient information from crowd sourcing based on the image, a parent or the image at launch will be analyzed instead to help determine a recommended t-shirt size.

For example, if the analysis module finds a sample size of 100 images running with a liberty: 8.5.1 image, a smaller t-shirt size was used 80 times, a medium t-shirt size was used 95 times, and a large t-shirt size was used 5 times. Within the 80 times the smaller t-shirt size was used, five of the users have provided positive feedback indicating liberty: 8.5.1 as their favorite images, which will add additional weight towards smaller t-shirt size as the recommended t-shirt size.

It should be noted that a user's initial input regarding their needs may be considered such as if instance is single point of failure or if the instance has high availability. These inputs will be taken into consideration when using crowd sourcing data as only the corresponding configuration will be selected as the sourcing data for analysis . . . if user is deploying Liberty: 8.5.1 with high availability, the system will only source the prior deployments that have liberty 9.5.1 deployed with high availability mode and select the corresponding recommended T-shirt size.

In the example above, consider that the customer might actually need a 8 GB memory resource but one is not available.

For example, on the IBM Container Service 10 customers have deployed a Redis cluster. Most customers are deploying the cluster using 8 GB container nodes since it is memory intensive caching application. When a new user begins to deploy Redis, the system indicates to them that 73% of community members are deploying Redis with 8 GB or greater memory resource size.

TABLE 1

| Unique ID | Image name:tag | Initial T-shirt size | Actual CPU | Actual memory | Actual disk |
|---|---|---|---|---|---|
| Unique generated id | Redis:latest | Large | 2-4 | 3-4 G | 8 G |
| Unique generated id | Redis:latest | Large | 2-4 | 3-4 G | 8 G |
| Unique generated id | Redis:latest | Large | 2-4 | 3-4 G | 8 G |
| Unique generated id | Jenkins:latest | Medium | 2 | 2 G | 5 G |
| Unique generated id | Wordpress:latest | Small | 1 | 1 G | 5 G |
| Unique generated id | Ibmliberty:latest | Small | 1 | 0.5 G | 2 G |
| Unique generated id | Ibmliberty:8.5.5.2 | Small | 1 | 0.5 G | 2 G |

TABLE 1-continued

| Unique ID | Image name:tag | Initial T-shirt size | Actual CPU | Actual memory | Actual disk |
|---|---|---|---|---|---|
| Unique generated id | Redis:latest | Large | 2-4 | 3-4 G | 8 G |
| Unique generated id | Redis:latest | Large | 2-4 | 3-4 G | 8 G |
| Unique generated id | Redis:latest | Large | 2-4 | 3-4 G | 8 G |
| Unique generated id | Redis:latest | Large | 2-4 | 3-4 G | 8 G |
| Unique generated id | Redis:latest | Large | 2-4 | 3-4 G | 8 G |
| Unique generated id | Redis:latest | Large | 2-4 | 3-4 G | 8 G |
| Unique generated id | Redis:latest | Large | 2-4 | 3-4 G | 8 G |
| Unique generated id | Redis:latest | Large | 2-4 | 3-4 G | 8 G |

Some embodiments of the present invention may include one, or more, of the following features, operations, characteristics and/or advantages: (i) as used herein "T-shirt size" means a predetermined allocation of resources associated with a "cloud-based container" which is utilized as the cloud-based container is deployed and re-deployed in a cloud computing system, T-shirt size typically includes at least allocation amounts for volatile type memory, non-volatile type storage and processing power; (ii) defining a first image of a container suitable for instantiation by a plurality of users; (iii) applying analytics to determine at least a first recommended T-shirt size associated with the first image; (iv) communicating the first recommended T-shirt size to a first user for use with a first instantiation of the first image; (v) the first user is of one of the following types: (a) a machine logic based user so that the first recommended T-shirt size is communicated in machine readable form and format, or (b) a human user so that the first recommended T-shirt size is communicated in human understandable form and format; (vi) the application of analytics is based, at least in part, upon the first user's existing set of images in a repository; (vii) the application of analytics is based, at least in part, upon historical usage of the first image by users other than the first user; (viii) the application of analytics is based, at least in part, upon load; and/or (ix) the application of analytics is based, at least in part, upon a comparison of the first compared to other users who have similar attributes in a community.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   a computer defining a first image of a container based on historical data related to container instantiation;
   the computer receiving from a first user, a request to deploy a first instantiation of a container corresponding to the first image, with the request including input data including information indicative of a planned context of the first instantiation;
   the computer applying a plurality of machine logic based rules to the input data to determine a first a first recommended T-shirt size associated with the first image comprises:
      the computer extracting data regarding the first image of the container running for each image name and tag;
      for each image name and tag, the computer determining containers using a same image name and tag;
      the computer analyzing a length of lifetime of the containers of the first image; and
      if the containers are running greater than a designated length of time, the computer analyzing characteristics of the container, wherein the characteristics of the container consists of: initial t-shirt size of the container by users other than the first user; actual resources used by the container; how often the container is rebuilt; the first user's existing set of images in a repository; historical usage of the first image by users other than the first user; and a comparison of the first user compared to other users who have similar attributes in a community; and the computer communicating the first recommended T-shirt size to the first user for use with the first instantiation of the container corresponding to the first image.

2. The method of claim 1 further comprising: performing crowd sourcing to obtain at least a portion of the historical data.

3. The method of claim 1, wherein the computer applying the plurality of machine logic based rules includes analytics, wherein the analytics includes discovery, interpretation, and communication of patterns in data; and relies on a simultaneous application of statistics, computer programming and operations research to quantify performance.

4. The method of claim 1, wherein the first recommended t-shirt size is communicated in a machine readable form and format.

5. The method of claim 1, wherein the first recommended t-shirt size is communicated in human understandable form and format.

6. A computer program product comprising: a computer comprising at least one processor, one or more memories, one or more computer readable storage media, the computer program product comprising a computer readable storage medium having program instructions embodied therewith, the program instructions executable by the computer to perform a method comprising:

defining, by the computer, a first image of a container based on historical data related to container instantiation;

receiving, by the computer, from a first user, a request to deploy a first instantiation of a container corresponding to the first image, with the request including input data including information indicative of a planned context of the first instantiation;

applying, by the computer, a plurality of machine logic based rules to the input data to determine a first a first recommended T-shirt size associated with the first image comprising extracting, by the computer, data regarding the first image of the container running for each image name and tag;

for each image name and tag, determining, by the computer, containers using a same image name and tag;

analyzing, by the computer, a length of lifetime of the containers of the first image; and if the containers are running greater than a designated length of time, analyzing, by the computer, characteristics of the container, wherein the characteristics of the container consists of: initial t-shirt size of the container by users other than the first user; actual resources used by the container; how often the container is rebuilt; the first user's existing set of images in a repository; historical usage of the first image by users other than the first user; and a comparison of the first user compared to other users who have similar attributes in a community; and communicating, by the computer, the first recommended T-shirt size to the first user for use with the first instantiation of the container corresponding to the first image.

7. The computer program product of claim 6, further comprising: performing crowd sourcing to obtain at least a portion of the historical data.

8. The computer program product of claim 6, wherein the application of the plurality of machine logic rules includes analytics, wherein the analytics includes discovery, interpretation, and communication of patterns in data; and relies on a simultaneous application of statistics, computer programming and operations research to quantify performance.

9. The computer program product of claim 6, wherein the first recommended t-shirt size is communicated in a machine readable form and format.

10. The computer program product of claim 6, wherein the first recommended t-shirt size is communicated in human understandable form and format.

11. A computer system comprising a computer comprising at least one processor, one or more memories, one or more computer readable storage media having program instructions executable by the computer to perform the program instructions comprising:

defining, by the computer, a first image of a container based on historical data related to container instantiation;

receiving, by the computer, from a first user, a request to deploy a first instantiation of a container corresponding to the first image, with the request including input data including information indicative of a planned context of the first instantiation;

applying, by the computer, a plurality of machine logic based rules to the input data to determine a first a first recommended T-shirt size associated with the first image comprising extracting, by the computer, data regarding the first image of the container running for each image name and tag;

for each image name and tag, determining, by the computer, containers using a same image name and tag;

analyzing, by the computer, a length of lifetime of the containers of the first image; and if the containers are running greater than a designated length of time, analyzing, by the computer, characteristics of the container, wherein the characteristics of the container consists of: initial t-shirt size of the container by users other than the first user; actual resources used by the container; how often the container is rebuilt; the first user's existing set of images in a repository; historical usage of the first image by users other than the first user; and a comparison of the first user compared to other users who have similar attributes in a community; and communicating, by the computer, the first recommended T-shirt size to the first user for use with the first instantiation of the container corresponding to the first image.

12. The computer system of claim 11, further comprising: performing crowd sourcing to obtain at least a portion of the historical data.

13. The computer system of claim 11, wherein the application of the plurality of machine logic rules includes analytics, wherein the analytics includes discovery, interpretation, and communication of patterns in data; and relies on a simultaneous application of statistics, computer programming and operations research to quantify performance.

14. The computer system of claim 11, wherein the first recommended t-shirt size is communicated in a machine readable form and format.

\* \* \* \* \*